April 23, 1968     R. F. McGIVERN     3,379,380
Y-TYPE ROTARY FILTER BED AGITATOR Filed Oct. 11, 1965     2 Sheets-Sheet 1

INVENTOR.
ROBERT F. McGIVERN
BY MAHONEY, MILLER & RAMBO
ATTORNEYS

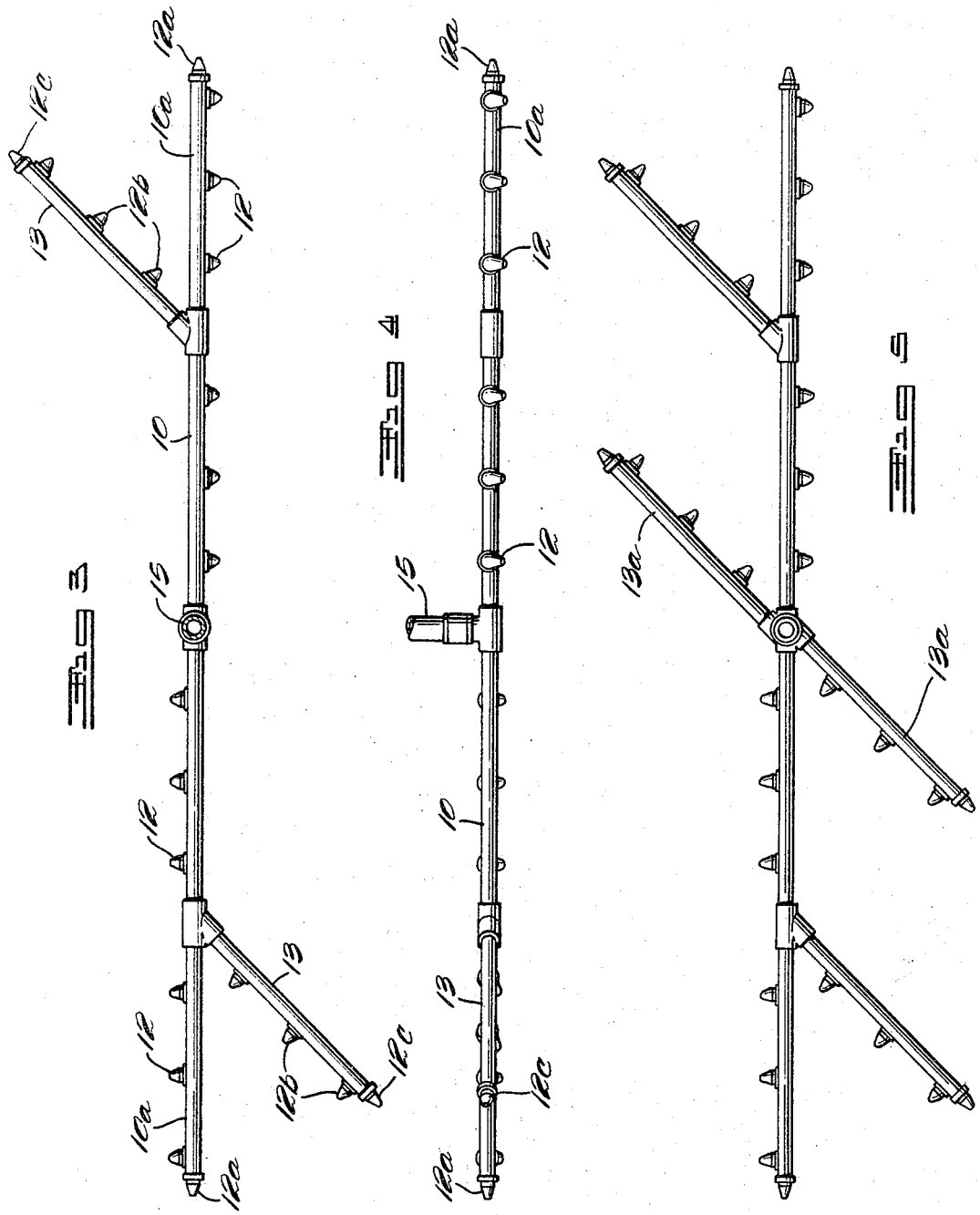

United States Patent Office 3,379,380
Patented Apr. 23, 1968

3,379,380
Y-TYPE ROTARY FILTER BED AGITATOR
Robert F. McGivern, Worthington, Ohio (% M-C-G Corp., 175 E. Broadway, Westerville, Ohio 43081)
Filed Oct. 11, 1965, Ser. No. 494,612
2 Claims. (Cl. 239—254)

ABSTRACT OF THE DISCLOSURE

A filter bed agitator in the form of a horizontal arm with a Y-shaped outer end adapted to rotate about a vertical axis. The agitator is particularly useful in cooperation with a filter tank or similar tank of square form for the backwashing of the filter material and is so designed that it will effectively backwash the material in the difficult-to-reach corners of the tank.

In the accompanying drawings, the preferred embodiment of this invention is illustrated but it is to be understood that specific variations may be made without departing from basic principles of the invention.

In these drawings:

FIGURE 3 is a top plan view of the agitator itself.

FIGURE 4 is a side elevational view of the agitator of FIGURE 3.

FIGURE 5 is a top plan view similar to FIGURE 3 but showing a modification of the agitator.

Figure 1:
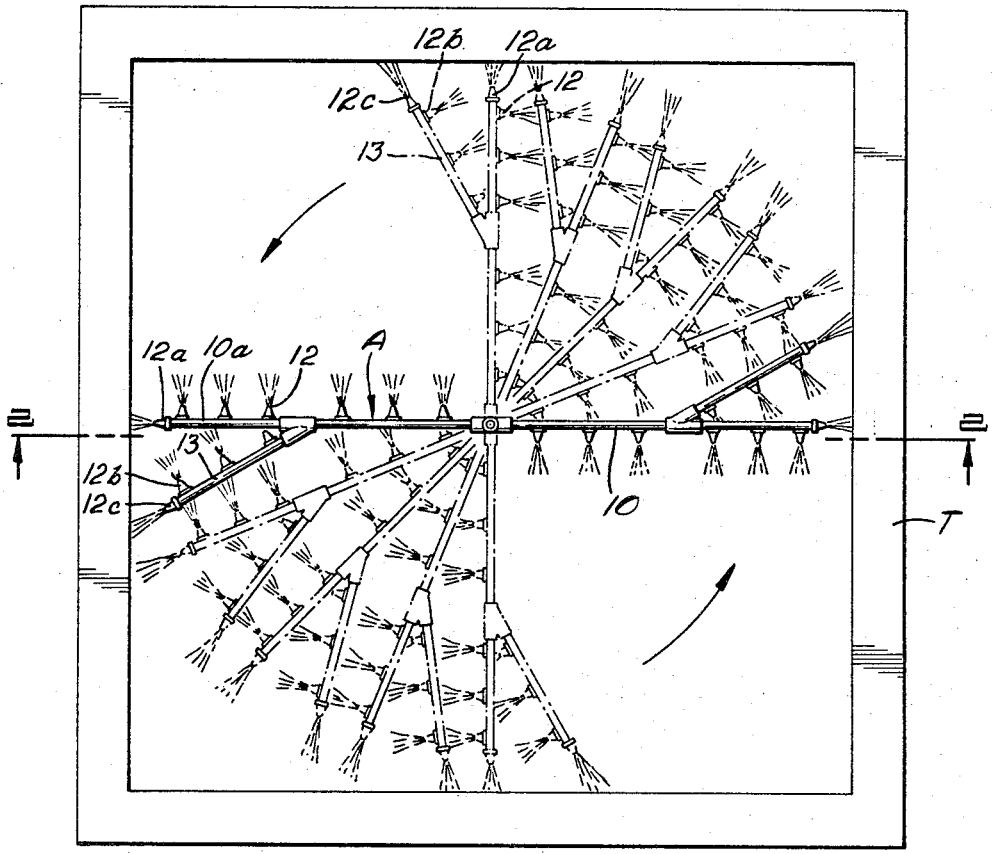
FIGURE 1 is a plan view of a filter bed tank with the agitator of this invention in position therein, the agitator being shown schematically in various positions of rotation.

With reference to the drawings, in FIGURE 1 there is illustrated one type of filter tank to which this invention is applicable. The filter tank T is of square form and, therefore, has corners which are difficult to backwash, assuming the tank is filled with a bed of filter material which has been used for some time so that backwashing is needed. This bed of filter material is indicated at F in FIGURE 2 and may be of various types of loose filter material but it is sufficient for purpose of this invention to state that it requires backwashing at intervals. The backwashing is effectively accomplished by the agitator A of this invention.

This agitator is in the form of an arm 10 which may be of suitable piping or tubing and which is disposed for rotation in a horizontal plane within the vertical extent of the filter bed. The arm 10 is mounted for rotation about a vertical axis by means of a centrally disposed bearing 11 from which it extends radially, preferably in both directions. The total length of the arm 10 will be just slightly less than the distance between opposed walls of the square tank as indicated in FIGURE 1.

The arm 10 is mounted for free rotation by means of the bearing 11 and its rotation about the central vertical axis, corresponding to the vertical axis of the bearing, is by means of a jet action. This jet action is produced by means of discharge of backwashing liquid through the nozzles 12 which are carried by the arm 10 and extend generally rearwardly relative to the direction of rotation of the arm.

An important feature of this invention is that each outer end of the arm 10 is provided with a Y-shaped arrangement upon which a series of the nozzles 12 are located. Thus, it will be noted that each straight end of the arm 10, as indicated in FIGURES 1 and 4, is provided with a branch 13 disposed at an acute angle relative to the straight end of the arm. The branch 13 may be disposed at various acute angles relative to the straight outer end portion 10a of the arm. The nozzles 12 are located at suitable axially spaced intervals along the pipe or conduit arm 10 and all extend rearwardly at an angle to the axis of the arm so that when the liquid is forced rearwardly from the nozzles, a jet action with a forward thrust results. The extreme ends 10a of the arms are provided with opposed, axially outwardly-directed nozzles 12a. In addition, each branch 13 is provided with nozzles 12b which are spaced axially thereof and are directed toward the end 10a of the arm. The outer extremity of each branch 13 is provided with another nozzle 12c directed axially outwardly. The nozzles 12 and 12b will be directed downwardly at an angle depending on the thickness of the filter bed in which the agitator rotates.

Figure 2:
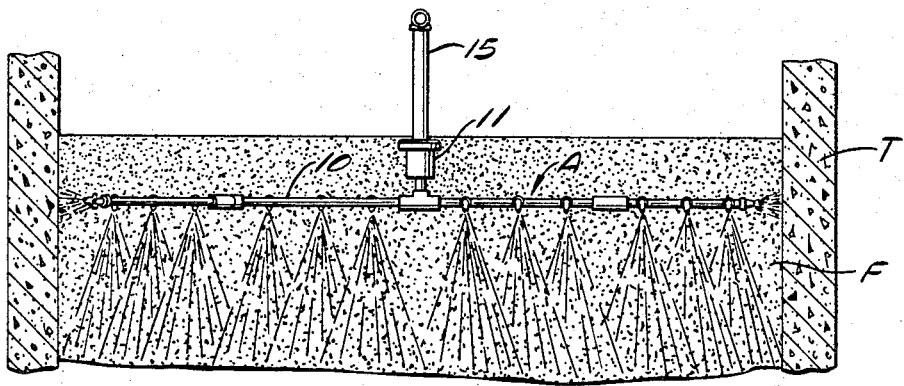
FIGURE 2 is a vertical sectional view taken along line 2—2 of FIGURE 1.

Backwash liquid may be supplied to the arm 10 through a central inlet pipe 15 shown in FIGURES 2 and 4. The liquid forced from the rearwardly directed nozzles 12 and 12B will set up a jetting action which will propel the arm through the bed, thereby agitating the bed by its movement and by the jetting action of the nozzles. Because of the Y-shaped outer ends of the arm 10, the corners of the bed will be effectively backwashed. All jets act to the rear, with resulting forward thrust, except those produced by the nozzles 12a and 12c which are directed axially outwardly. Two individual passes at the corners of the filter, as indicated in FIGURE 1, are obtained by movement of each end of the agitator past the corner, the first being obtained by the nozzles 12c and 12b on the branch 13 and the second by the nozzles 12a and 12 on the end 10a of the main part of the arm. Thus, the corners are effectively backwashed and the filter bed material at the corners is effectively cleaned.

In FIGURE 5, I have illustrated an agitator which is identical with that described except that it is provided with the opposed angular branches 13a at the midpoint of the main arm. The nozzle arrangement on these branches 13a is the same as on the arm 13 and results in additional agitation of the filter bed.

It will be apparent from the above that this invention provides a radially extending agitator conduit arm rotatable about a central axis in a rectangular or square filter bed, with the arm provided with rearwardly-directed jet nozzles to give a forward thrust, and with each radial extremity of the arm being of Y-form so as to more effectively reach and clean the corners of the filter bed as the agitator revolves.

Having thus described this invention, what is claimed is:

1. A filter bed agitator for use in backwashing with liquid a filter bed having corners comprising a radially extending, liquid-receiving conduit arm mounted for rotation about an axis for sweeping past one or more of the corners, said conduit arm being provided with axially spaced discharge nozzles disposed at an angle to the axis thereof for producing a jet action with resulting forward thrust for treating the filter bed with agitating jets of liquid under pressure and revolving the arm about said axis in a preselected direction, said arm having a leading and trailing edge relative to its revolving direction and having an outer extremity of Y-form with said nozzles located in both branches of the Y and with all of said nozzles directed generally rearwardly from the trailing edge of said arm including those on both branches of said Y-extremity, said arm comprising a main conduit extending radially in both directions from said axis to opposed outer ends, and the Y outer extremity comprising a communicating conduit branch extending outwardly at an acute angle relative to the associated end of said main conduit and forwardly relative to the leading edge thereof, and having axially spaced nozzles directed rearwardly and outwardly from the trailing edge of said conduit toward the leading edge of said main conduit, and at least one of the branches of the Y having an axially outwardly directed nozzle in its outer end extremity.

2. A filter bed according to claim 1 in which each outer end extremity of the main conduit and each outer end extremity of the Y-branch is provided with an axially outwardly directed nozzle.

References Cited

UNITED STATES PATENTS

| | | | |
|---|---|---|---|
| 2,301,025 | 11/1942 | Friend et al. | 239—254 X |
| 2,309,916 | 2/1943 | Palmer | 210—272 X |
| 2,309,917 | 2/1943 | Palmer | 210—273 X |
| 2,769,547 | 11/1956 | Hirsch | 239—254 X |
| 3,039,612 | 6/1962 | Palmer | 210—272 |

M. HENSON WOOD, JR., *Primary Examiner.*

ROBERT B. REEVES, *Examiner.*

H. NATTER, *Assistant Examiner.*